United States Patent
Shatzkin et al.

(10) Patent No.: US 9,474,988 B2
(45) Date of Patent: Oct. 25, 2016

(54) VARIABLE SPEED SYSTEM TO MOTORIZE COUNTERWEIGHT LINE SETS

(71) Applicants: Charles B Shatzkin, New Woodstock, NY (US); Andrew J McArthur, North Syracuse, NY (US); Rodney F Kaiser, Syracuse, NY (US)

(72) Inventors: Charles B Shatzkin, New Woodstock, NY (US); Andrew J McArthur, North Syracuse, NY (US); Rodney F Kaiser, Syracuse, NY (US)

( * ) Notice: Subject to any disclaimer, the term of this patent is extended or adjusted under 35 U.S.C. 154(b) by 0 days.

(21) Appl. No.: 14/794,166

(22) Filed: Jul. 8, 2015

(65) Prior Publication Data
US 2016/0045837 A1 Feb. 18, 2016

Related U.S. Application Data

(60) Provisional application No. 62/036,139, filed on Aug. 12, 2014.

(51) Int. Cl.
| | |
|---|---|
| *A47H 1/10* | (2006.01) |
| *A63J 1/02* | (2006.01) |
| *F16M 13/02* | (2006.01) |
| *B66D 1/60* | (2006.01) |

(52) U.S. Cl.
CPC ............... *A63J 1/028* (2013.01); *B66D 1/60* (2013.01); *F16M 13/022* (2013.01)

(58) Field of Classification Search
CPC ........ A63J 1/028; B66D 1/39; F16M 13/022
See application file for complete search history.

(56) References Cited

U.S. PATENT DOCUMENTS

| | | |
|---|---|---|
| 4,795,405 A | 1/1989 | Davis |
| 5,106,057 A | 4/1992 | Feller et al. |
| 5,996,970 A | 12/1999 | Auerbach |
| 6,520,485 B1 | 2/2003 | Soot |
| 7,165,295 B2 | 1/2007 | DeWitt et al. |
| 7,971,856 B2 | 7/2011 | Kochan |
| 2009/0127527 A1* | 5/2009 | Hoffend, III ............ A63J 1/028 254/338 |
| 2012/0130689 A1 | 5/2012 | Moon |

* cited by examiner

*Primary Examiner* — Amy Sterling
(74) *Attorney, Agent, or Firm* — Bernhard P. Molldrem, Jr.

(57) ABSTRACT

A manual theatrical rigging system is motorized to achieve greater control of speed and accuracy, avoiding need to load counterweights, and without sacrifice of standard line-set spacing. Each line set has a wire-reinforced drive belt connected with the associated hand line, and is operated by a geared or gearless motorized winch. A winch support frame supports the motorized winches in a number of rows, with the winches in positions staggered from row to row. The counterweight arbor holds a fixed counterweight. A computerized control panel permits a single operator to manage the entire system of line sets. An overspeed safety brake brakes the line set if the movement exceeds a safe speed.

10 Claims, 3 Drawing Sheets

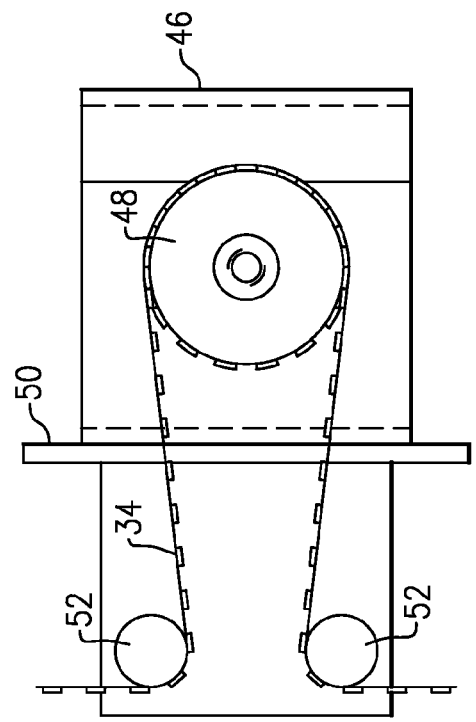
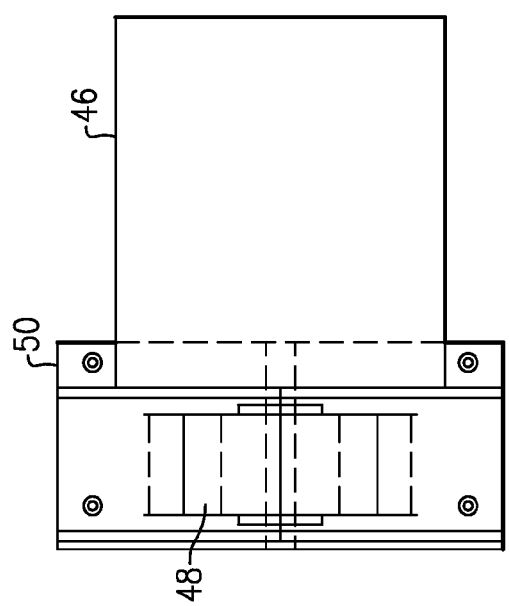
FIG.3B
FIG.3A

VARIABLE SPEED SYSTEM TO MOTORIZE COUNTERWEIGHT LINE SETS

Priority is claimed of Provisional Patent Application No. 62/036,139, filed Aug. 12, 2014, the disclosure of which is incorporated herein by reference.

BACKGROUND AND FIELD OF THE INVENTION

The present invention is directed theatrical rigging systems, and is more particularly directed to a system in which operating arrangements with counterweights replace the manual counterweight line sets that are typically used in theatrical venues, convention centers and other places of public assembly, and the operating arrangements are motorized for safer, faster, and quieter operation.

DESCRIPTION OF THE PRIOR ART

Theatrical rigging systems that employ counterweight line sets are primarily used for vertical movement of a load, such as scenery, curtains and other materials in theatrical and other venues. The operating principle is to counterbalance the weight of the horizontal pipe or rod that suspends the load, plus the weight of the load itself, with counterweights that are positioned on an attached counterweight arbor. Once balanced, a human operator can move the system manually to bring the scenery or other items to the desired location. The horizontal pipe is suspended from wire ropes that extend up to pulleys (one pulley per wire rope) that convert the travel of the rope from vertical to horizontal. The wire ropes then travel to a "head block" pulley that converts the travel of all of the wire ropes associated with the pipe back to vertical. The ropes attach to the counterweight arbor. The system moves as a unit: as the counterweight arbor rises the pipe batten descends on a one-to-one basis. The wire ropes for each pipe all connect to a single line that connects to the associated counterweight arbor. During set up, weights are added to (or removed from) the respective arbor to match the weight of the horizontal pipe plus the scenery or other load that is suspended from it. The hand line or motorized line is then pulled to lift or lower the scenery, drape, or other load, as needed for the performance. Most often, these are manual systems, in which a stage technician moves the line set by hand, up or down. The manual system, while very flexible, has numerous drawbacks. The term "hand line" as used in this specification refers to the operating line, whether operated manually or motorized.

Since the human operator controls the speed and end location of the movement, it is often difficult to replicate movements exactly, as would be required for multiple performances of a given program. The operator can sometimes miss the target location, which affects the performance adversely, and can put the performers at risk from being hit by moving equipment.

A number of line sets are present at each venue, and each line set requires a human operator to carry out the movement at the correct time. This means that if several sets have to move at the same time, the venue will need that number of operators. This demands greater personnel expense, or limits the flexibility of the performance by restricting the number of sets that can be moved simultaneously.

The typical manual rigging system has inherent risk built in, as the counterweights are often out of balance. When adding or removing loads from the pipes, the counterbalance weights on the arbor must also be added or removed to match the weight of the changing load. This can be difficult for the human operator to carry out, and resulting out-of-balance line sets may "runaway" from the control of the operator. The runaway condition can result in a catastrophic crash of the system. Crashes not only create risk of damage to equipment but also can present a life-threatening risk to performers and stage workers. Typically there are no over-speed brakes or other safety features to prevent a crash or soften the drop of the equipment that results from a runaway.

Another safety risk arises from unauthorized and unqualified operators gaining access to the equipment. If such person can gain access to the room where the manual counter-weighted line sets are located, there are no foolproof methods of preventing their operation of the system.

For the conventional rigging system, a complete set of counterweights (typically two-thirds of the overall theoretical capacity of the venue's complement of line sets) must be maintained in the facility. This adds both significant weight load to the building and additional falling hazards from the counterweights as they are stored at height above the stage floor. Systems to power manual counterweight sets have been developed but they also have drawbacks:

At present, such powered systems operate at a slow fixed speed (25 feet per minute/0.1 meters per second), which is a severe limit on flexibility in the theatrical performance. These motorized line sets are frequently too noisy to be used during a performance. Due to their slow speed, many venues will not convert their sets to motorized sets, as the sets would be unable to provide the higher and flexible speeds that are unavailable except with manual operation.

Additionally, the present-day modes for motorizing line sets, due to the dimensions of the motors and gear drives, will not provide for retention of industry standard spacing between line sets. This can limit the number of line sets available. Consequently, any conversion to a motorized system would require major modifications and/or many additional sheaves for the system to operate in a satisfactory manner.

Proscenium theaters typically have numerous "line sets" from which scenery, drapes, electrical and sound equipment are suspended. The line sets are used to move the equipment into and out of the range of audience sight line to "set the stage". These line sets are typically comprised of a horizontal pipe batten (to which the equipment is attached that needs to be moved), and wire-rope lift lines that travel from the pipe, over a series of pulleys, to a counterweight arbor. This arbor is filled with enough weight to counterbalance the load on the pipe, making it possible to easily move the load up or down as required. Weights are added or removed manually to balance the load when it changes. These line sets are spaced very tightly (six inches apart) from the front to the back of the stage house so as to facilitate the ability to locate equipment virtually anywhere in the stage area. The theater must also maintain an inventory of counterweights equal to the capacity of all the sets, as it is unpredictable as to which sets will have what weight(s) on them. This increases the load on the building structure.

Operation of the line set system requires highly trained personnel as the addition/removal of the weights can create dangerous out of balance conditions. Untrained personnel are also at risk of dropping the weights (up to 45 lbs each) from the height of the elevated loading gallery where the weight changing takes place.

Attempts to mechanize the system have suffered from several disadvantages: Systems for mechanizing typically require a second set of pulleys to add the mechanization. These operate at a very low speed as well. Mechanization increases cost of the installation and adds both noise and additional maintenance expense. The mechanization system does not permit keeping the 6" spacing because the equipment is too large. This means that the theater either has to eliminate sets or keep some as manual, eliminating the safety benefits of mechanization as weights must still be moved manually for the un-mechanized sets The current modes of mechanization are fixed speed, whereas manual operation provides complete variability in the speed in which the equipment is moved in and out of view—a crucial consideration for theatrical productions.

OBJECTS AND SUMMARY OF THE INVENTION

Accordingly, it is an object of this invention to provide a motorized rigging system that avoids the problems of the prior art as discussed just above.

It is a more specific object to provide a rigging system with motorized operators that have a variable speed feature, so they can raise and lower the scenery or equipment as fast as a human operator could operate the system (e.g., up to 180 feet per minute or 0.9 meters per second)

It is another object to provide a rigging system that can achieve perfect replication of target and speed for each performance, independent of the person operating the equipment.

It is a further object to provide a motorized rigging system that is quiet enough to be used in performance environments.

It is yet another object to provide the system with electronic controls that can prevent unauthorized use of the system.

A yet further object is to eliminate the need for weights to be added or removed from the counterweight arbor, so that the system handles all imbalances, and runaways and accidental drops are avoided, and also to eliminate any need for storage of counterweights.

Another object is to incorporate an over-speed safety brake to capture the load and to reduce or eliminate a crash.

A still further object is to provide for retrofitting of the theater space's existing manual system, permitting venues to retain their investment in their existing manual systems while gaining advantages in performance and safety. In the case of a retrofitted system, the venue's existing counterweights can be used as a means for achieving additional balancing of the load, thus reducing the motor size required to safely move/control loads.

Another object is to reduce the risk associated with operation by untrained or under-trained volunteer personnel such as may occur at school buildings or community theaters.

Another objective is an overall design in which the venue has a choice of geared or gearless drives depending on the loads or weight of the scenery or other items, and in which a traction drive can be employed, rather than requiring chains or drums.

Still another objective is for the motorized line sets to maintain industry standard line-set spacing.

In accordance with an aspect if the present invention, a variable speed motorized theatrical rigging system has a plurality of line sets, each line set having a respective horizontal support member, e.g., pipe batten, suspended by a set of lift lines. Each line of each line set passes a respective loft block that is suspended from a grid iron or other overhead support system and which changes the line direction from vertical to horizontal. The several lift lines of the line set then all pass through a head block to change the direction back to vertical. The lift lines are attached to an associated counterweight arbor that is adapted to travel vertically, and associated hand line attached to the set of lift lines. There can typically be a floor block, with the hand line looping around the floor block and an overhead block or pulley. In this case, there are a plurality of wire reinforced drive belts, each connected with a respective hand line of an associated line set. A plurality of geared or gearless motorized winches, are each associated with a given one of said wire reinforced drive belts, and each has a toothed drive pulley over which the associated drive belt passes. A geared or gearless motor for each winch is coupled to drive the toothed drive pulley as needed in forward and reverse directions for raising or lowering the support pipe batten or other support member of the respective line set.

A winch support frame is provided at the location of the hand lines to support the plurality of winches such that each of said line sets is matched to an associated one of the motorized winches.

As a way of maintaining the standard spacing between line sets, the winch support frame positions the winches in a plurality of rows, one above the other, and with the horizontal positions of the winches being staggered from one row to the next. To maintain the line sets with the successive line sets at a spacing of substantially six inches, and the winch support frame staggers the rows of winches at an offset of substantially six inches from one row to another.

Favorably, the drive belt is a toothed belt with teeth mating with teeth of the associated toothed drive pulley.

A control panel for permits the stage technician to operate the line sets, controllably applying power to each of the geared or gearless motorized winches. Each of the motorized winches is controllably adjustable to operate the vertical movement of the associated horizontal support member in a range of up to about 180 feet per minute, up or down.

In a preferred arrangement, the counterweight arbor of each of the line sets includes a fixed counterweight non-removably affixed to the carriage of the arbor. Alternatively, the counterweights provided with the manual line sets can also be added to achieve a balance between the horizontal support member and its load versus the counterweight arbor.

Each of the line sets can include an over-speed safety brake to engage and brake the line set if the line set exceeds a predetermined speed, so as to avoid a catastrophic drop of the scenery or equipment supported on the horizontal support member. Favorably, the over-speed safety brake can be incorporated into the head block or counterweight arbor associated with each given line set.

The motorized rigging arrangement of the present invention achieves several advantages over earlier systems, with improved drive system, noise reduction, safety, and efficiency.

Drive system: For each line set, the arrangements of the present invention utilize a wire-rope-reinforced polymer drive belt, or equivalent, to drive the counterweight system. The belt can be driven in a variety of ways: variable speed gearless or geared drive motors, belt or band drives. In a set up typical of this invention, the drive belt can be toothed to engage teeth or sprockets on the output wheel of the drive motor. The system's motor location is variable depending on the theater or performance space (i.e., the system can be installed at grid level, on existing weight bridges, in an arbor pit, or at floor level). Thus the invention can accommodate most building configurations while retaining industry standard spacing between line sets. The system does not require the addition of a parallel set of sheaves for operation.

Noise reduction: The belt drive eliminates the noise caused by chain or wire rope of prior-art drive systems. With the belt drive, chain sprockets are eliminated as are numerous direction-changing idler pulleys and sprockets. The significant reduction in system noise allows for higher speeds and for variable speeds in performance, greater than previously possible. The system can easily accommodate other noise reduction methods such as acoustical covers, floating mounting of the drive system, variable speed start and stop, and noise-reducing brake systems.

Safety: The belt system technology provides superior long-term service life and safe operation. The belt drive provides an eight-times ("8×") safety factor over the weight capacity of the existing manual line set. The over-speed safety brake captures the load, should the drive belt fail. The control system and motor drives provide sub-millimeter accuracy for targeting. The system of the present invention favorably incorporates both "hard" (physical travel limit switches) and "soft" (software controlled) travel limits, and the computerized control system can be programmed to eliminate collisions between adjacent sets.

Efficiency: The system does not change line set spacing, permitting the performance capacity of the venue to remain unchanged, i.e., eliminating reduction in the venue's capacity. The control system permits a single human operator to control numerous sets even at high speed. Because no counterweight changes are required, set up time is greatly reduced.

The above and many other objects, features, and advantages of the rigging arrangement of the present invention will become apparent from the ensuing detailed description of a preferred embodiment, which is to be considered in connection with the accompany Drawing figures.

BRIEF DESCRIPTION OF THE DRAWING

FIG. 3A is a front view of a traction drive winch as employed in this embodiment.

FIG. 3B is a corresponding end view showing details of the traction drive winch of FIG. 3A, and its associated drive belt.

DETAILED DESCRIPTION OF THE PREFERRED EMBODIMENT

Figure 1:
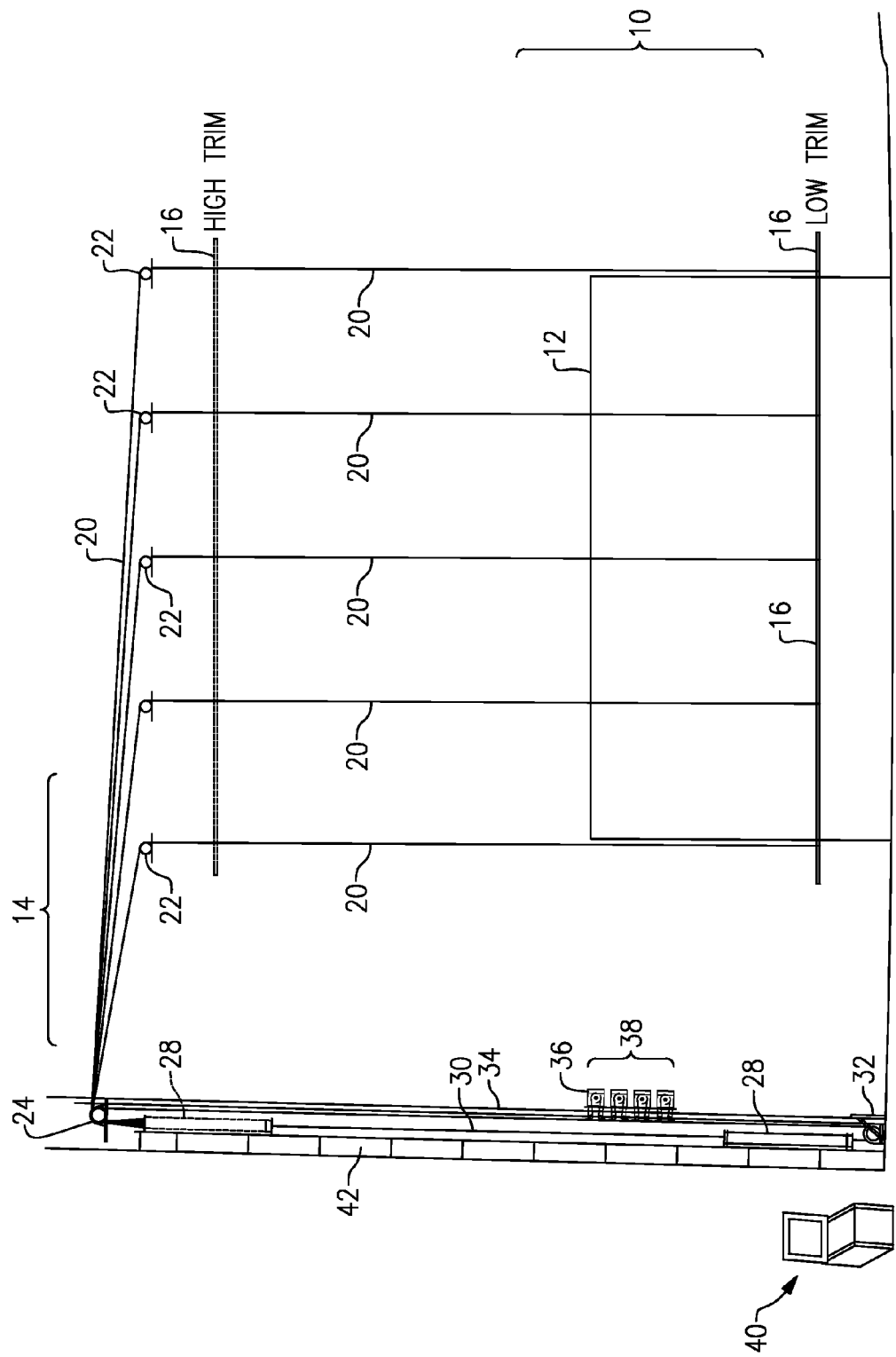
FIG. 1 is a front elevational view of one embodiment of the invention, here shown on a performance stage and showing this embodiment in conjunction with one existing line set of a fly or counterweight system.

Referring to the Drawing and initially to FIG. 1, a theatrical or performance stage 10 is shown looking out from the stage floor behind the proscenium arch or opening 12 that divides the performance space from the auditorium. One typical line set 14, out of a plurality of line sets of the rigging system, is illustrated. Here, a horizontal pipe batten 16 (or other horizontally disposed support member) is provided for hanging scenery, lights, props, or other stage equipment, and here is shown lowered to a low trim position (in solid lines) or raised to a high trim position (in broken line). The batten 16 can be raised or lowered to any desired position during a performance. The pipe batten 16 is suspended from an array of vertical lift lines 20 (here, five lift lines are shown). The lift lines 20 extend to the ceiling or grid iron above the stage where each lift line passes over a respective loft block 22 which changes the direction of the line 20. The several lift lines then pass over a head block 24, comprising one or more sheaves) and this changes the direction of the lift lines 20 from horizontal to vertical. The lines extend down to attach to a counterweight arbor 28. The arbor 28 is shown in a lowered position in solid line and in a raised position in broken line. The counterweight arbor 28 contains sufficient weight to balance the weight of the pipe batten 16 plus about half the weight of the expected load. While additional counterweights are usually not needed beyond the permanent counterweight, additional counterweights can be added to balance very heavy loads.

A rope hand line 30 extends from the counterweight arbor 28, over the head block 24 and then down to connect with a wire-reinforced drive belt 34. This drive belt 34 then passes over a respective motor-driven winch 36, then through a tensioning belt block 32, which may be floor mounted, and then back up to reach the counterweight arbor 28. Each remaining line set in the rigging array will have its own similar arrangement, with winch 36 and drive belt 34.

Figure 2:
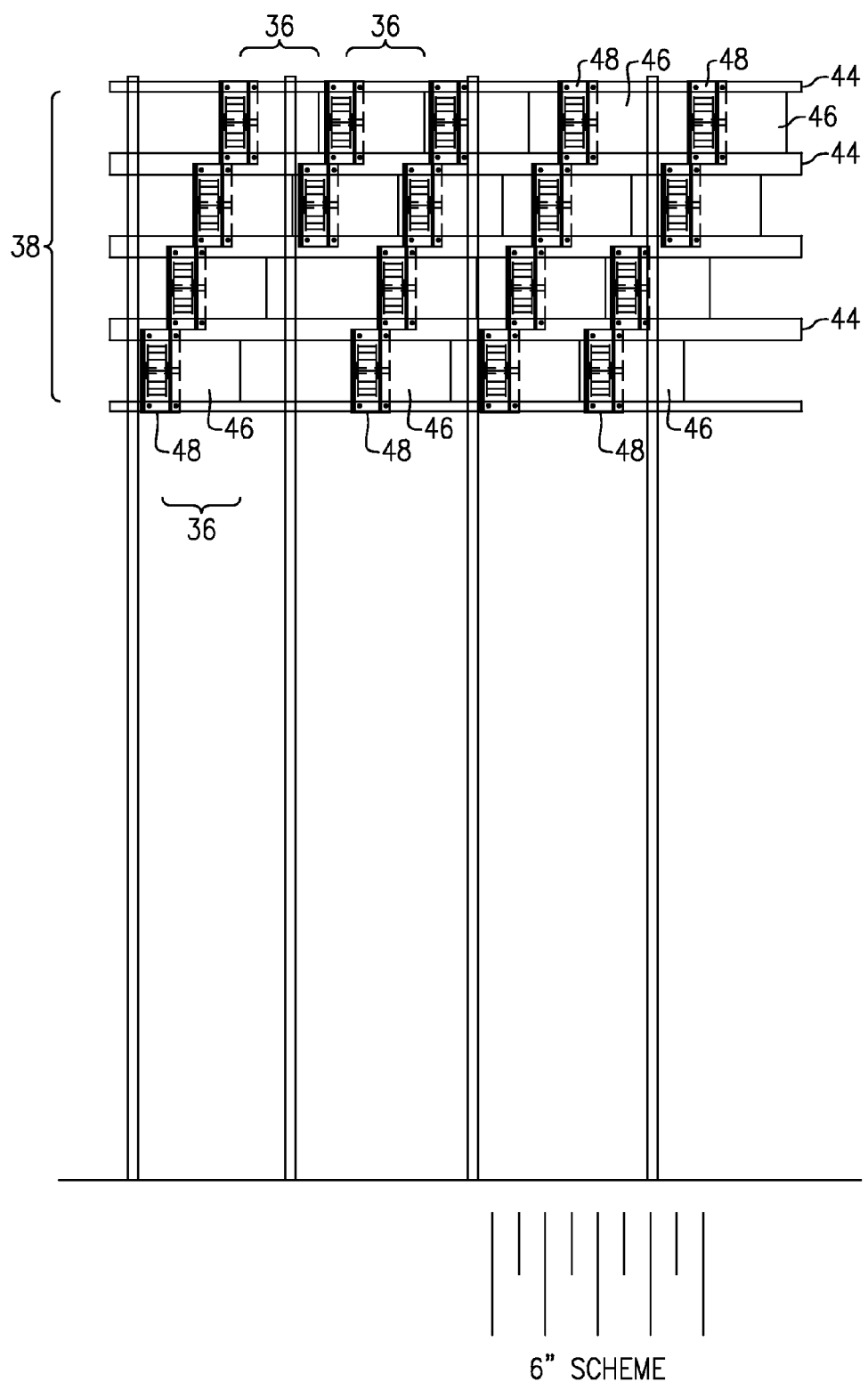
FIG. 2 is a detail of the winch support frame of this embodiment, with an array of traction winches maintaining a standard line set spacing of six inches between line sets.

A control panel 40 is shown set in the left wing of the stage for controlling the various motorized winches for the respective line sets. Here the control panel is in the form of a computer with screen and keyboard, and can be programmed to raise and lower the loads of the various line sets at the appropriate times during a performance, and to coordinate their operation so that they do not interfere with one another. The winches 36 for the several line sets are supported on a winch support frame 38 along side one wall of the theater, and a lattice support track is positioned to guide the vertical travel of the counterweight arbors 28. The traction drive winch units move the arbors 28 and pipe battens 16 up and down as required at whatever variable speed is required for the production, up to the maximum speed for safe operation FIG. 2 shows the winch support frame 38 which is mounted onto the side wall of the stage area, and can comprise a plurality of horizontal frame members 44. These frame members support a number of motorized winches 36, one for each line set. As shown here, the winches 36 are arranged in horizontal rows with the positions of the winches staggered or offset from one row to the next so that the positions of the winches align with the positions of the line sets. This allow the rigging system to maintain the usual six-inch line-set spacing. Each of the motorized winches comprises a gear motor 46 and an associated traction gear pulley 48 over which the respective wire-reinforced traction belt 34 travels.

A preferred arrangement of the motorized winch 36 is shown in FIG. 3A, wherein the gear motor 46 and the associated drive pulley 48 are mounted on a winch base 50, which attaches to the winch support frame 38. As shown in FIG. 3B, the winch has a pair of idler pulleys 52, one above and one below the toothed drive pulley 48, so that the associated belt travels over the one idler pulley, over the toothed drive pulley 48, and then over the other idler pulley. Here, the toothed drive belt 34 and associated toothed drive pulley 48 are employed.

A clutch (not shown) or brake can be included in each of the motorized winches 36 to that the line set can be locked in place in its desired position after the batten and load are raised or lowered. In addition, an indexing mechanism can be included on the winch or on the drive belt to identify the vertical position of the associated pipe batten 16 and its load. This information is fed to the computer of the control panel 40 to ensure that the scenery, lights, or other equipment is properly positioned. The computerized control panel 40 can be protected with password, face recognition or other system to lock when the operator steps away and prevent unauthorized use.

The head block 24 favorably includes a safety brake mechanism to grip the hand line or the lift lines if the speed of the line set, either in ascent or in descent, exceeds a safe threshold, preventing a potential scenery crash. In place of the safety head block, safety brakes can be added to the counterweight arbor 28.

In smaller theaters, a gearless drive motor may be used in place of the gearmotor 46. There are four rows of motorized winches in this embodiment, so that the positions of the respective drive traction winches 36 can be staggered front-to-back to accommodate the typical six-inch spacing from one line set to the next. There can be a different number of rows and the staggering or offset distance can be different, depending on the specific mechanical configurations of the motorized winches.

The belt 34, as mentioned above can be indexed, that is, the belt can carry index markings that are detected by an optical or magnetic sensor (not shown) to send position information to the control panel 40 and to start and stop the line set at the desired position, and also to assist in controlling the speed of motion of the line set and the attached load.

Theatrical rigging arrangements of the present invention thus provide great advantages over the state of the art. The embodiments of this invention provide mechanization without an additional set of pulleys and can uses the existing manual rigging infrastructure and add a simple winch frame to mount the motorized winches. The standard six-inch line set spacing is retained. The line sets can be operated from a remote location, and can have variable speed, with computer control. This invention eliminates the need to move counterweights to balance loads, as the gearmotor can manage most loads without needing to add counterweights to the arbor. An extremely quiet system is achieved through the selection of polymer belts in place of chains. In this invention, established line set spacing is retained while allowing for complete mechanization of the theater's line sets, and eliminating the safety issues that accompany the use of manual counterweights. The motor system can handle out-of-balance loads from zero pounds to the weight capacity of the set plus industry standard safety multiples.

While the invention is described in terms of a preferred embodiment, it should be understood that the invention is not limited to that embodiment, but rather many modifications and variations are possible without departing from the scope and spirit of this invention, as defined in the appended claims.

We claim:

1. A variable speed motorized theatrical rigging system comprising:
    a plurality of line sets, each line set having a respective horizontal support member extending laterally above a performance area, and being suspended by a set of lines, each line of such set passing through a respective loft block, and the set of lines extending laterally from the respective loft blocks and passing through a head block and attaching to an associated counterweight arbor that is adapted to travel vertically, with an associated hand line attached to the counterweight arbor of the line set;
    the line sets being arranged at a predetermined standard spacing from one another in a front-to-back direction above the performance area;
    a plurality of wire-reinforced drive belts, each associated with a respective one of said line sets and being connected with the hand line of the respective line set;
    a plurality of geared or gearless motorized winches, each motorized winch being associated with a given one of said wire-reinforced drive belts, and each having a traction drive pulley over which the associated drive belt passes, and a geared or gearless motor coupled to drive the traction drive pulley as needed in forward and reverse directions for raising or lowering the respective line set; and
    a winch support frame supporting said plurality of winches such that each of said line sets is matched to an associated one of said motorized winches, wherein said winch support frame positions said winches in a plurality of rows one above the other and with the positions of the winches being staggered by a predetermined offset in said front-to-back direction from one row to the next, wherein said offset equals said predetermined standard spacing such that each said motorized winch is at the position of its associated line set.

2. The variable speed motorized theatrical rigging system of claim 1 wherein said plurality of line sets is arranged with the successive line sets having said standard spacing being substantially six inches, and the winch support frame staggers the rows of said winches with said predetermined offset of substantially six inches from row to row.

3. The variable speed motorized theatrical rigging system of claim 1 wherein each said drive belt is a toothed belt with teeth mating with teeth of the associated drive traction pulley.

4. The variable speed motorized theatrical rigging system of claim 1 comprising a control panel for controllably applying power to each of the geared or gearless motorized winches for the respective ones of said plurality of line sets.

5. The variable speed motorized theatrical rigging system of claim 1 wherein each of said motorized winches is controllably adjustable to operate the vertical movement of the associated horizontal support member in a range of up to about 180 feet per minute.

6. The variable speed motorized theatrical rigging system of claim 1 wherein the counterweight arbor of each of said line sets includes a fixed counterweight non-removably affixed thereto.

7. The variable speed motorized theatrical rigging system of claim 1 wherein each said line set includes an over-speed safety brake to engage and brake the line set if the line set exceeds a predetermined speed.

8. The variable speed motorized theatrical rigging system of claim 7 wherein said over-speed safety brake is incorporated into the head block associated with said line set.

9. The variable speed motorized theatrical rigging system of claim 3 wherein each said hand line extends from the respective counterweight arbor over the respective head block then down to connect with the associated drive belt, and the drive belt then passes over the associated drive traction pulley to a tensioning belt block and then back up to reach the respective counterweight arbor.

10. The variable speed motorized theatrical rigging system of claim 4 wherein said control panel includes a programmable computer adapted to be programmed to raise and lower the loads of any of the plurality of line sets at appropriate times during a performance, and automatically to coordinate operation of said line sets such that the line sets do not interfere with one another.

* * * * *